United States Patent
Hamill et al.

(10) Patent No.: US 10,318,287 B2
(45) Date of Patent: Jun. 11, 2019

(54) DEPLOYING DOCUMENTS TO A SERVER IN A SPECIFIC ENVIRONMENT

(71) Applicant: HEWLETT PACKARD ENTERPRISE DEVELOPMENT LP, Houston, TX (US)

(72) Inventors: Hugh Hamill, Galway (IE); Eoghan Shields, Galway (IE); Colin Shine, Galway (IE)

(73) Assignee: Hewlett Packard Enterprise Development LP, Houston, TX (US)

( * ) Notice: Subject to any disclaimer, the term of this patent is extended or adjusted under 35 U.S.C. 154(b) by 85 days.

(21) Appl. No.: 15/387,588

(22) Filed: Dec. 21, 2016

(65) Prior Publication Data

US 2018/0173522 A1    Jun. 21, 2018

(51) Int. Cl.
| | |
|---|---|
| *G06F 9/44* | (2018.01) |
| *G06F 9/445* | (2018.01) |
| *G06F 9/45* | (2006.01) |
| *G06F 8/73* | (2018.01) |
| *G06F 8/60* | (2018.01) |

(52) U.S. Cl.
CPC . *G06F 8/73* (2013.01); *G06F 8/60* (2013.01)

(58) Field of Classification Search
CPC .. G06F 8/73; G06F 11/2705; G06F 11/30887; G06F 8/61; G06F 8/71; G06F 8/60; G06F 17/30887; G06F 17/2705
See application file for complete search history.

(56) References Cited

U.S. PATENT DOCUMENTS

| | | | |
|---|---|---|---|
| 8,417,798 B2 | 4/2013 | Chen et al. | |
| 8,819,629 B2 | 8/2014 | Sherril | |
| 9,037,597 B2 | 5/2015 | McMahon et al. | |
| 9,015,924 B2 | 11/2015 | McMahon et al. | |
| 9,274,783 B2 | 3/2016 | Vakov et al. | |
| 9,396,091 B2 | 7/2016 | Bally et al. | |
| 2006/0075398 A1* | 4/2006 | Bennett | G06F 8/61 717/170 |

(Continued)

OTHER PUBLICATIONS

Hiranya Jayathilaka, Towards Automatically Estimating Porting Effort Between Web Service APIs, 2014, pp. 774-781. https://ieeexplore.ieee.org/stamp/stamp.jsp?tp=&arnumber=6930607 (Year: 2014).*

(Continued)

*Primary Examiner* — Mongbao Nguyen
(74) *Attorney, Agent, or Firm* — Hewlett Packard Enterprise Patent Department

(57) ABSTRACT

A method includes parsing, by a computing device, configuration data associated with multiple application programming interfaces (APIs) that are served by multiple remote applications executing on multiple servers in different environments respectively; determining, by the computing device, a uniform resource location (URL) of a remote application executing on a particular server deployed in the specific environment; receiving, by the computing device, a version of the remote application at the URL; retrieving, by the computing device, multiple documents associated with the particular API corresponding to the version from an artifact repository; and deploying, by the computing device, the multiple documents to the particular server in the specific environment.

14 Claims, 5 Drawing Sheets

(56) References Cited

U.S. PATENT DOCUMENTS

| | | | |
|---|---|---|---|
| 2010/0192146 A1* | 7/2010 | Stay | G06F 8/61 |
| | | | 717/176 |
| 2012/0331519 A1* | 12/2012 | Yu | G06F 21/12 |
| | | | 726/1 |
| 2013/0124608 A1* | 5/2013 | Gregorio | G06F 8/30 |
| | | | 709/203 |
| 2014/0040877 A1* | 2/2014 | Goldman | G06F 8/61 |
| | | | 717/174 |
| 2014/0289699 A1* | 9/2014 | Paterson | G06F 11/3664 |
| | | | 717/106 |
| 2014/0289702 A1* | 9/2014 | McMahon | G06F 21/60 |
| | | | 717/120 |
| 2014/0366000 A1 | 12/2014 | Batabyal et al. | |
| 2015/0277884 A1* | 10/2015 | Giammaria | G06F 16/9535 |
| | | | 717/120 |
| 2015/0326640 A1* | 11/2015 | Jellick | H04L 41/082 |
| | | | 709/217 |
| 2016/0026461 A1* | 1/2016 | Bannister | G06F 8/73 |
| | | | 717/123 |
| 2016/0092442 A1* | 3/2016 | Gillett | G06F 17/30011 |
| | | | 707/608 |
| 2016/0110754 A1* | 4/2016 | Miyazaki | G06F 8/61 |
| | | | 705/14.39 |
| 2016/0162701 A1* | 6/2016 | Rosenberg | H04L 12/1886 |
| | | | 726/4 |
| 2016/0191343 A1* | 6/2016 | Dong | G06F 9/5083 |
| | | | 709/226 |
| 2017/0003945 A1* | 1/2017 | Bao | G06F 8/61 |
| 2017/0060557 A1* | 3/2017 | Bendelac | G06F 8/60 |
| 2017/0090894 A1* | 3/2017 | Maus | G06F 8/60 |
| 2017/0124211 A1* | 5/2017 | Suter | G06F 16/9566 |
| 2017/0161028 A1* | 6/2017 | Wood | G06F 8/60 |
| 2017/0161030 A1* | 6/2017 | Wood | G06F 8/36 |
| 2017/0346802 A1* | 11/2017 | Gruskin | H04L 63/08 |
| 2018/0091324 A1* | 3/2018 | Logvinov | H04L 12/1886 |
| 2018/0091624 A1* | 3/2018 | Forbes | H04L 45/74 |
| 2018/0173510 A1* | 6/2018 | Koshkin | G06F 8/60 |

OTHER PUBLICATIONS

Chandra Krintz, Cloud Platform Support for API Governance, 2014, pp. 615-618. https://www.cs.ucsb.edu/~ckrintz/papers/fopaas.pdf (Year: 2014).*

Kyle Schutt, Cloud Software Development Platforms: A Comparative Overview, 2016, pp. 1-11. https://ieeexplore.ieee.org/stamp/stamp.jsp?tp=&arnumber=7516122 (Year: 2016).*

Juan Luis Perez, Performance Characterization of the servIoTicy API: an IoT-as-a-Service Data Management Platform, 2015, pp. 62-71. https://ieeexplore.ieee.org/stamp/stamp.jsp?tp=&arnumber=7184865 (Year: 2015).*

Joudeh T., "asp.net Web API Documentation using Swagger", Bit of Technology, Aug. 25, 2014, (Web Page), 34 pages.

Unknown, "Release the Full Potential of Your API!" DynamicApis.com (Web Page), Sep. 29, 2016, 3 pages.

* cited by examiner

DEPLOYING DOCUMENTS TO A SERVER IN A SPECIFIC ENVIRONMENT

BACKGROUND

When deploying a suite of related application programming interfaces (APIs) in a specific environment, such as, a development environment, a testing environment, a performance testing environment, a production environment, etc., it is difficult to ensure that appropriate documentation for the versions of each API deployed in each environment is available. There is often a single source of documentation, which is associated with the version deployed to the production environment. The same source of documentation may also be used in other internal environments, e.g., the development environment, the testing environment, etc. In the event the API is down for maintenance or unavailable due to a runtime issue, the API documentation will also be unavailable for all the other environments.

BRIEF DESCRIPTION OF THE DRAWINGS

The following detailed description references the drawings, wherein.

DETAILED DESCRIPTION

Figure 1:
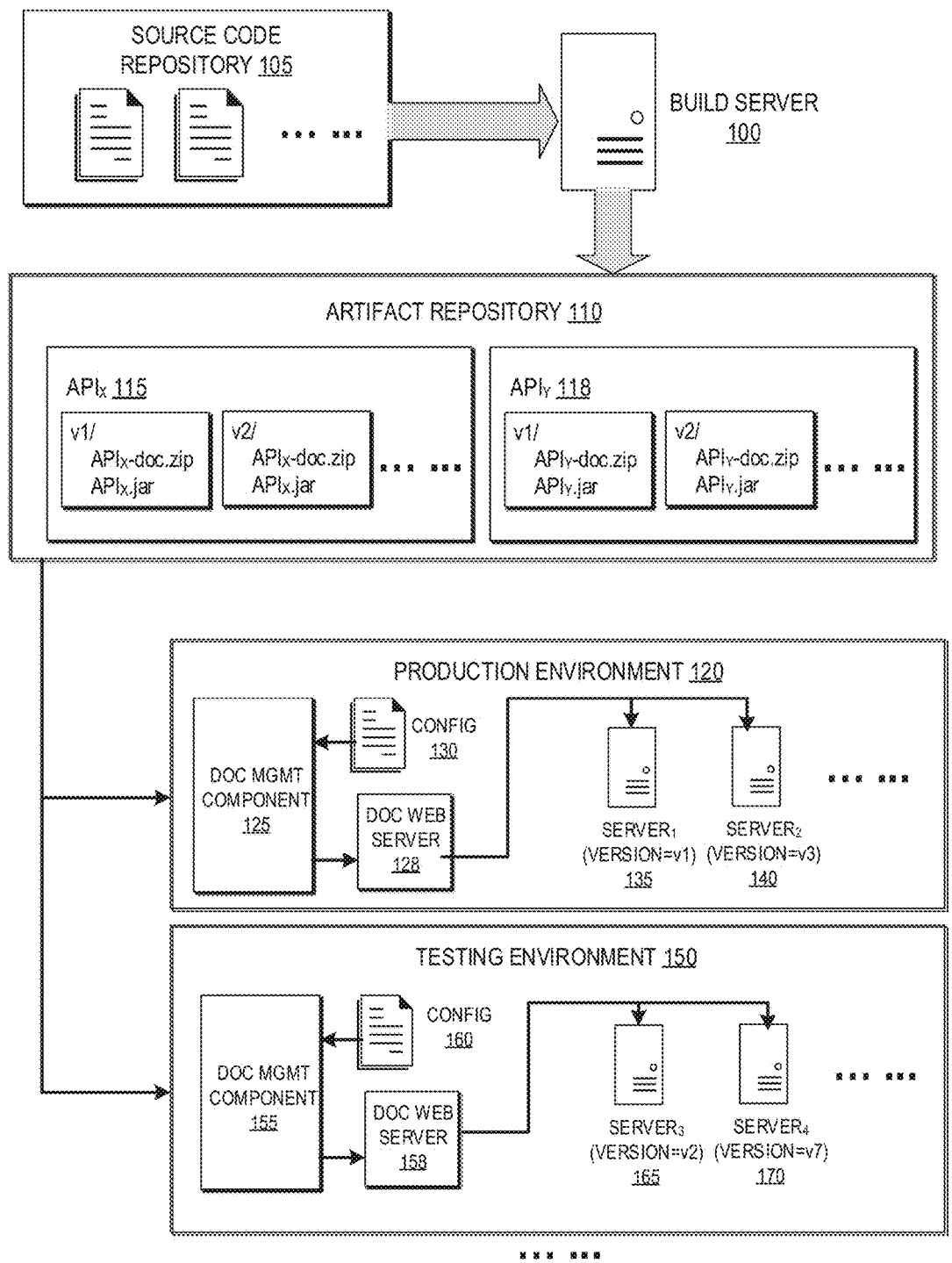
FIG. 1 is a block diagram of an example system architecture for deploying documents to a server in a specific environment.

In today's software production lifecycle, APIs may be deployed in multiple environments, including but not limited to, a pre-development environment, a development environment, a testing environment, a performance testing environment, a production environment, etc. A single source of API documentation, which is associated with the version deployed to a specific environment (e.g., a production environment), may be used in other environments (e.g., a development environment or a testing environment) as well. Therefore, API features that are under development or updates to existing API features that could be included in other environments (e.g., the development environment or the testing environment) may not be a part of the specific environment (e.g., the production environment), thus may not be available in the source of API documentations.

The solution described herein provides an automated way of keeping the API documentation compatible with the version of API deployed in a specific environment that a document web server resides in. The document web server communicates with a document management component that receives configuration data with regard to the APIs deployed in the servers in a specific environment as an input. The document management component automatically checks a website at a URL corresponding to the APIs in the specific environment for updates in the version, and retrieves API documentations from the artifact repository in response to an update being detected in the specific environment.

Unlike other solutions that use metadata or scripts to mark up the differences between API documentations for different environments, the solution described herein involves no human intervention. The deployed APIs in each specific environment are monitored by the document management component, and corresponding API documentations deployed with the correct versions are automatically retrieved for each specific environment when an update is detected in the deployed APIs.

This solution can be integrated easily with Test Driven Documentation (TDD) techniques, such as, Spring Representational State Transfer (REST) Docs. The Spring REST Docs can document RESTful APIs by combining hand written documentation (e.g., an HTML template) with automatically generated code snippets. Therefore, for each build of the API corresponding to a specific version in a specific environment, a full set of API documentations including the latest codes can be automatically generated using the TDD techniques.

As used herein, an "environment" generally refers to a collection of servers and/or applications that are in a specific configuration and accessible to a particular group of users. For example, the production environment would include released APIs that are accessible for end users or external parties to an organization. The testing environment would include the APIs that are under production, as well as the latest codes that have not been released yet, which are accessible to internal testers and developers. The development environment would include the APIs that are under testing, as well as latest codes that are developed but not yet tested, which are accessible to the internal developers. The environment may be guarded by a firewall policy, which ensures the particular group of users have access to the collection APIs in the specific environment.

Architecture

FIG. 1 is a block diagram of an example architecture for deploying documents to a server in a specific environment. Specifically, FIG. 1 includes a source code repository 105 that comprises a plurality of source codes, a build server 100, an artifact repository 110, and a plurality of environments (e.g., a production environment 120, a testing environment 150, etc). As used herein, source code generally refers to a collection of computer instructions, with or without comments, written using a human-readable programming language prior to compilation. In some examples, the source code can be often transformed by an assembler or compiler into executable binary code, which may be stored for execution at a later time by a computing device. In other examples, source code may be interpreted and immediately executed by a computing device.

Source codes from source code repository 105 are compiled and built into executable binary files by build server 100. Build server 100 generally refers to any computing device that can monitor source codes for changes, compile and build a project corresponding to a particular build version when the source codes change. The project may include a collection of source codes checked into source code repository 105 by developers in a specific environment. Build server 100 also produces artifacts, such as, APIx-doc.zip, APIx-doc.jar, etc., and deploys these produced artifacts to artifact repository 110. Build server 100 can ensure that uncommitted source codes do not become a part of the released code. Moreover, build server 100 can be used to schedule compile tasks (e.g. nightly builds) of large projects located in source code repository 105.

For each build version of an API corresponding to a particular remote application, a set of API documentations and compiled executable binary files are generated by build server 100 and stored in an artifact repository 110. Specifically, multiple hierarchies of directories may be created in artifact repository 110. In one example, each top-level directory may correspond to a particular API, e.g., directory $API_X$ 115 storing API documentations for $API_X$ and directory $API_Y$ 118 storing API documentations as well as compiled binary files for $API_Y$. Moreover, each top-level directory may include multiple sub-directories, whereas each sub-directory stores the API documentations and binaries for a particular build version. For example, the documentations the particular build version of the particular API may be stored in a compressed file (e.g., a ZIP file), and the binaries may be stored in a JAR file. In some examples, the sub-directories may include source code files as well.

During software production lifecycle, build server 100 periodically generates a build version that may include the latest source codes (or a branch of the latest source codes) of a particular API that are checked into source code repository 105. Some API build versions may not be deployed in any environments; some API build versions may be deployed to a specific environment (e.g., the development environment); some API build versions may be deployed to a subset of the multiple environments (e.g., the development environment and the testing environment); and, some API build versions may be deployed in every environment.

On the other hand, each specific environment may include multiple servers that are deployed with a large number of APIs. Moreover, each API deployed in each specific environment may correspond to a different API build version, and thus needs different API documentations. Therefore, a document management component (e.g., document management component 125 and document management component 155) needs to coordinate the deployment of API documentations such that the versions of the API documentation deployed in the specific environment are compatible with the APIs deployed on the multiple servers in the specific environment. Also, the document management component can aggregate multiple sets of API documentations that correspond to every API deployed in the specific environment, publish the multiple sets of API documentations in a single document website hosted by a document web server, and make the API documentations accessible to the particular group of users in the specific environment.

In the example illustrated in FIG. 1, production environment 120 includes a document management component 125, a document web server 128, and a plurality of servers (e.g., server 135 and server 140). Testing environment 150 includes a document management component 155, a document web server 158, and a plurality of servers (e.g., server 165 and server 170). In some examples, document management component 125 (or document management component 155) may reside on document web server 128 (or document web server 158). In some examples, document management component 125 (or document management component 155) may be external to document web server 128 (or document web server 158) and communicates to document web server 128 (or document web server 158) via a network.

During operations, document management component 125 (or document management component 155) receives configuration data, e.g., configuration file 130 (or configuration file 160). The configuration data may be any type of data files, including but not limited to, an extensible markup language (XML) file, a JavaScript Object Notation (JSON) file, a YAML file, a binary file, a database file, etc. Also, each configuration data file includes multiple API tags. Each API tag is associated with a URL corresponding to the remote application. Document management component 125 (or document management component 155) then parses through the received configuration data to retrieve the URLs corresponding to the APIs that are to be deployed with API documentations. An example configuration data file is shown in Table 1 below.

TABLE 1

<APIx>
https://server1/apix
</APIx>
<APIy>
https://server2/apiy
</APIy>

Furthermore, document management component 125 (or document management component 155) monitors the API documentations by periodically accessing each API at the corresponding URL and querying for a version of the applications deployed at the servers (e.g., version 1 on $server_1$ 135, version 3 on $server_2$ 140, version 2 on $server_3$ 165, version 7 on $server_4$ 170, etc). Note that FIG. 1 is provided for illustration purposes only. A server may be deployed with multiple applications, each having a different version and a different URL. For example, $server_1$ 135 may be deployed with $API_X$, which can be accessed through the URL https://server1/apix; $server_2$ 140 may be deployed with $API_Y$, which can be accessed through the URL https://server2/apiy. In other examples, $server_1$ 135 may be deployed with multiple APIs, including both $API_X$ and $API_Y$, and document management component 125 could access every API deployed on servers in the similar fashion.

Moreover, document management component 125 can save the current versions of the applications deployed at the servers in a version cache. If the version result received from the query is different from the version stored in the version cache, then document management component 125 can detect a change in the version of the application, which indicates that updated API documentations need to be deployed to the corresponding server for the respective API. Therefore, document management component 125 will retrieve the updated API documentations in the same version as the query result from artifact repository 110. For example, assuming that document management component 125 detects that the version of $API_Y$ deployed on $server_2$ 140 has changed to version 3. In order to update the API documentations for $API_Y$, document management component 125 can retrieve the $API_Y$-doc.zip and $API_Y$.jar files from the directory corresponding to $API_Y$ 118 and the sub-directory corresponding to v3/.

Then, document management component 125 can install the $API_Y$ documentations in the respective directory (e.g., $API_Y$/) on document web server 128. During the APIY documentations' installation process, document management component 125 will decompress the compressed API documentation files (optionally the executable binaries files and/or source code files), modify the hierarchies of directories corresponding to $API_Y$ as needed, and install the decompressed files in their respective directory and/or sub-directories on document web server 128.

Artifact repository 110 may be any storage device that is capable of communicating with build server 100 and stores files, such as, API documentations, source code files, executable binary files, etc. In some examples, artifact repository 110 is a standalone file server. In other examples, artifact repository 110 is a distributed system that may be deployed over a cloud infrastructure. In some examples, the files stored on artifact repository 110 are indexed by API and each API's build versions. Although FIG. 1 shows that API documentations are stored in compressed format (e.g., $API_x$-doc.zip, $API_x$-doc.jar, etc.) in artifact repository 110, other formats may be used to store and manage the API documentations as well.

In some examples, instead of deploying one document management component in each environment, the system may deploy a single document management component that manages multiple environments and communicates with document web servers in each environment.

Note that it is difficult to coordinate the deployment of API documentations manually, because the API documentations for any build version of any API can be changed at any time. Thus, manual coordination of the API documentation deployment from artifact repository 110 to document web servers (e.g., document web server 125, document web server 155, etc.) will likely result in inconsistencies between the deployed API and the API documentation in a specific environment.

In the example illustrated in FIG. 1, artifact repository 110 may have API documentations for every version of every API that is built by build server 100. Within each specific environment, such as, production environment 120, testing environment 150, etc., a different set of APIs could be deployed. The APIs in each specific environment may be deployed with different versions and in any combination. Thus, a document web server, for example, document web server 125 in production environment 120, needs to be populated with the correct version and set of API documentations corresponding to the combination of APIs deployed on servers 135 and 140 in production environment 120.

Unlike other version management systems, such as, source depot for source code management, the document management component herein proactively queries the version of APIs from remote applications at servers in different environments by accessing the URLs corresponding to the APIs. The system can be scaled up to manage multiple specific environments, where each specific environment may have hundreds of remote applications deployed on multiple servers. Different servers in the same specific environment may have different versions of the same API developed. The document management component can keep track of the versions of every API on every server in every specific environment, retrieve and deploy updated API documentations to ensure that the API documentations are in sync with the version of the remote applications in each specific environment.

Moreover, document web server 128 (or document web server 158) maintains an index web page that includes links to different API documentations. In one example, the API documentations corresponding each API are published at a respective directory on document web server 128 (or document web server 158). An example structure of published API documentations corresponding to production environment 120 is shown in Table 2 below.

TABLE 2 index.html
APIx/
    APIx-doc.html
APIy/
    APIy-doc.html

In this example, APIx-doc.html may be a web page that displays API documentations for version 1 of APIx, which is deployed on servers 135. Also, APIy-doc.html may be a web page that displays API documentations for version 3 of APIy, which is deployed on $server_2$ 140 as illustrated in FIG. 1. Last but not least, index.html may be a home page that displays links to API documentations corresponding to each API deployed in production environment 120. Thus, index.html may include a link to/APIx/APIx-doc.html and another link to /APIy/APIy-doc.html in the example in FIG. 1. Therefore, the system herein provides a unified view of APIs deployed in a specific environment, and also dynamically monitor and updates the API documentations as the versions of those APIs changes. As a result, the group of users in the specific environment is provided with a centralized website to view up-to-date API documentations for every API deployed in every server in the specific environment. This improves the user experience and reduces the cost of API documentation management.

Processes to Deploy Documentations to a Server in a Specific Environment

Figure 2:
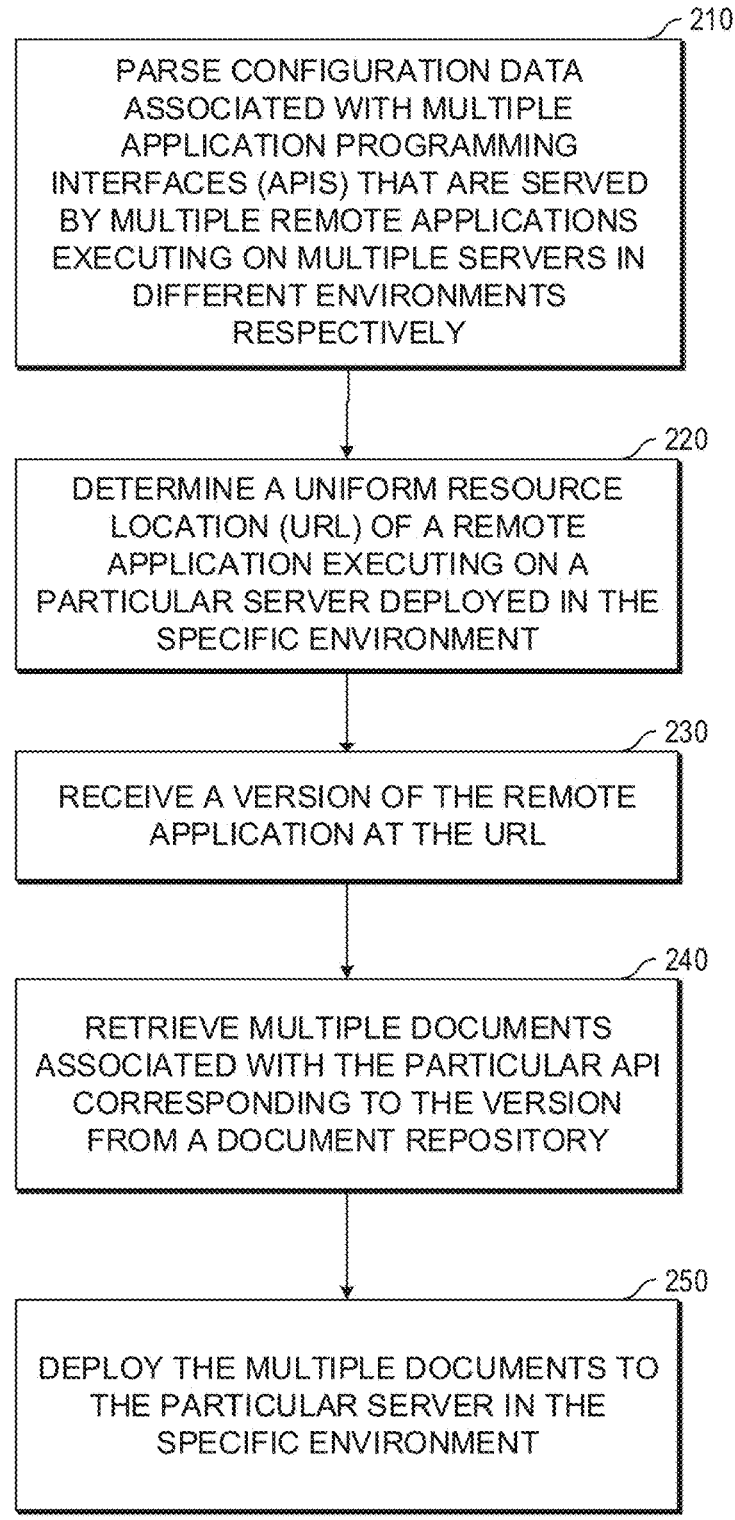
FIG. 2 is a flowchart of an example process of deploying documents to a server in a specific environment.
Figure 3:
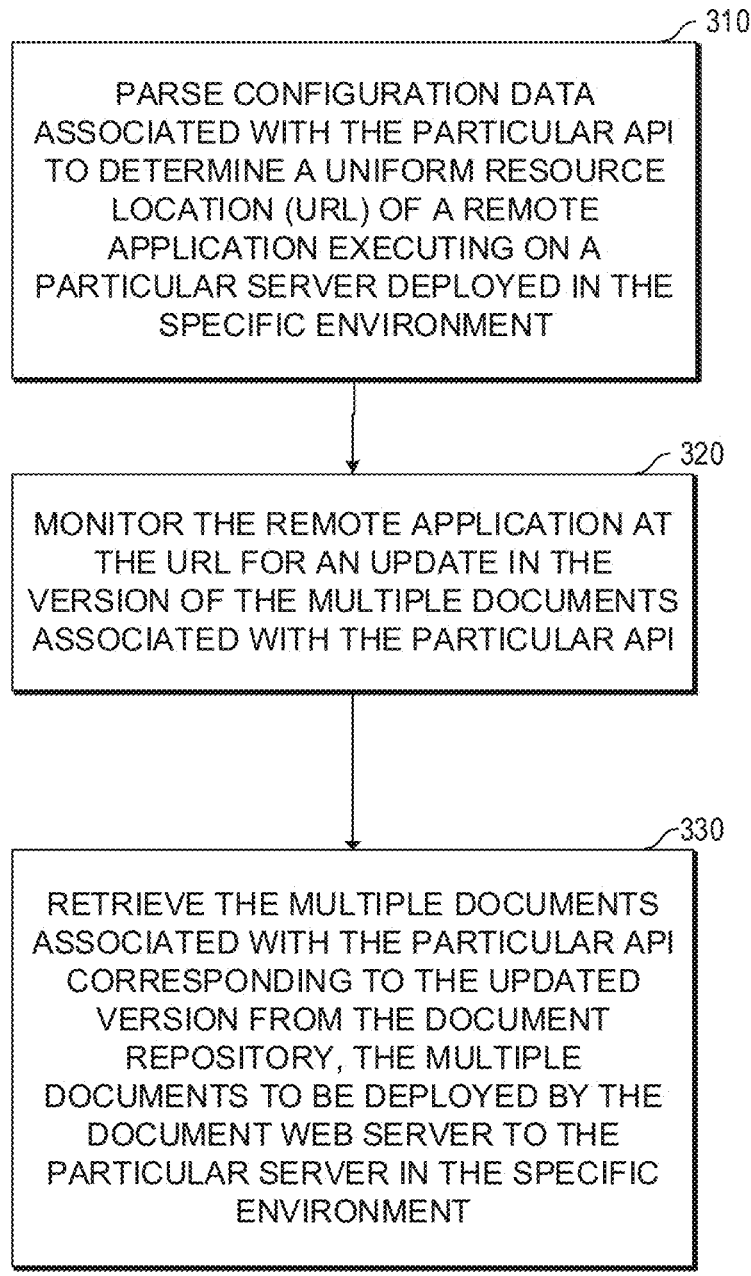
FIG. 3 is a flowchart of an example process of deploying documents to a server in a specific environment.
Figure 4:
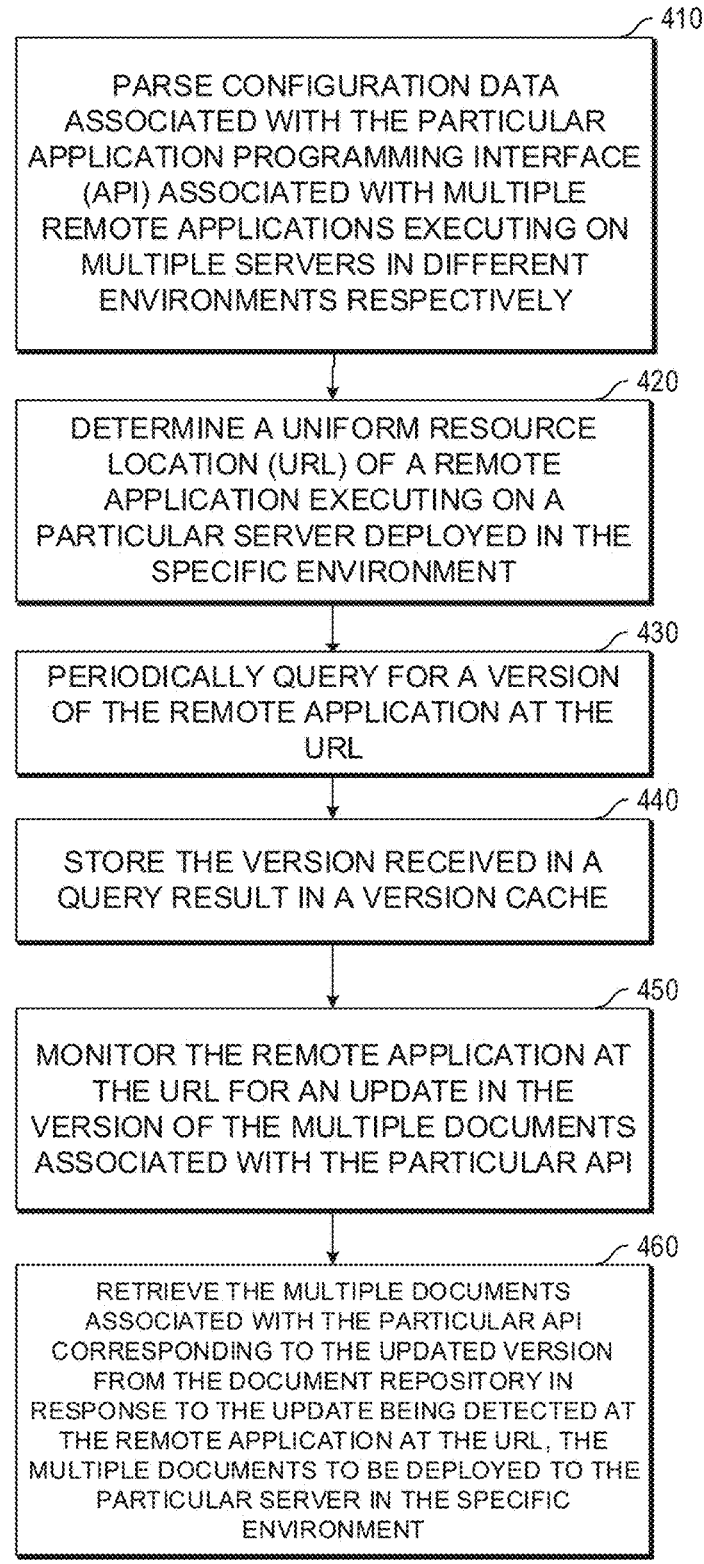
FIG. 4 is a flowchart of an example process of deploying documents to a server in a specific environment.

In discussing FIGS. 2-4, references may be made to the components in FIG. 1 to provide contextual examples. In one implementation, document management component 125 or document management component 155 described in FIG. 1 executes operations 210-250, 310-330, and 410-460 to deploy documentations to a server in a specific environment. Further, although FIGS. 2-4 are described as implemented by a computing device, it may be executed on other suitable devices or components. For example, FIGS. 2-4 may be implemented in the form of executable instructions on a machine-readable storage medium 520 as in FIG. 5.

FIG. 2 is a flowchart of an example process of deploying documentations to a server in a specific environment. First, a computing device may parse configuration data associated with multiple application programming interfaces (APIs) that are served by multiple remote applications executing on multiple servers in different environments respectively (operation 210). Then, the computing device may determine a uniform resource location (URL) of a remote application executing on a particular server deployed in the specific environment (operation 220). Next, the computing device may receive a version of the remote application at the URL (operation 230). Thereafter, the computing device may retrieve multiple documents associated with the particular API corresponding to the version from an artifact repository (operation 240). Moreover, the computing device may deploy the multiple documents to the particular server in the specific environment.

FIG. 3 is a flowchart of another example process of deploying documentations to a server in a specific environment. In this example, the computing device first can parse configuration data associated with the particular API to determine a uniform resource location (URL) of a remote application executing on a particular server deployed in the specific environment (operation 310). Then, the computing device can monitor the remote application at the URL for an update in the version of the multiple documents associated with the particular API (operation 320). Further, the computing device can retrieve the multiple documents associated with the particular API corresponding to the updated version from the artifact repository (operation 330). Here, the multiple documents could be deployed by the document web server to the particular server in the specific environment.

FIG. 4 is a flowchart of yet another example process of deploying documentations to a server in a specific environment. Here, the computing device may parse configuration data associated with the particular application programming interface (API) associated with multiple remote applications executing on multiple servers in different environments respectively (operation 410). Then, the computing device may determine a uniform resource location (URL) of a remote application executing on a particular server deployed in the specific environment (operation 420). Next, the computing device may periodically query for a version of the remote application at the URL (operation 430). Also, the computing device may store the version received in a query result in a version cache (operation 440). Moreover, the computing device may monitor the remote application at the URL for an update in the version of the multiple documents associated with the particular API (operation 450). Finally, the computing device may retrieve the multiple documents associated with the particular API corresponding to the updated version from the artifact repository in response to the update being detected at the remote application at the URL (operation 460). Here, the multiple documents can be deployed to the particular server in the specific environment.

In some implementations, the computing device can monitor a website at the URL for a change in a version of the multiple documents associated with the particular API. Also, the computing device can retrieve an updated version of the multiple documents associated with the particular API from the artifact repository, if and when a change is detected while monitoring the website at the URL. Further, the computing device can deploy the updated version of the multiple documents to the particular server in the specific environment.

In some examples, the specific environment includes a collection of servers and applications that work together at a particular production phase. The collection of servers and applications may be accessible to a particular set of users. For example, the specific environment may include, but is not limited to, a production environment accessible to end users, a testing environment accessible to testers, a development environment accessible to developers, etc.

In some examples, the configuration data may include, but is not limited to, an extensible markup language (XML) file, a JavaScript Object Notation (JSON) file, a YAML file, a binary file, a database file, etc. Further, the configuration data may include multiple API tags, whereas each API tag can be associated with a URL corresponding to the remote application.

In some examples, the computing device may deploy the multiple documents by creating a hierarchy of directories, storing multiple API documentations in the hierarchy of directories, and installing multiple executable binary artifacts to the hierarchy of directories.

The multiple documents deployed in the particular server in the specific environment could have a different collection of API documentations and executable binary artifacts stored in the hierarchy of directories than a collection of API documentations and executable binary artifacts deployed in another server in another environment.

In some examples, the document management component can be external to the document web server, and communicate with both the document web server and the artifact repository. In some examples, the document management component may reside on the document web server and communicate with the artifact repository.

The artifact repository may include a plurality of directories. Each directory may store, e.g., in compressed form, a collection of API documentations and a collection of executable binary artifacts that are associated with a particular version of the particular API received from a build server.

Computing Device to Deploy Documentations to a Server in a Specific Environment

Figure 5:
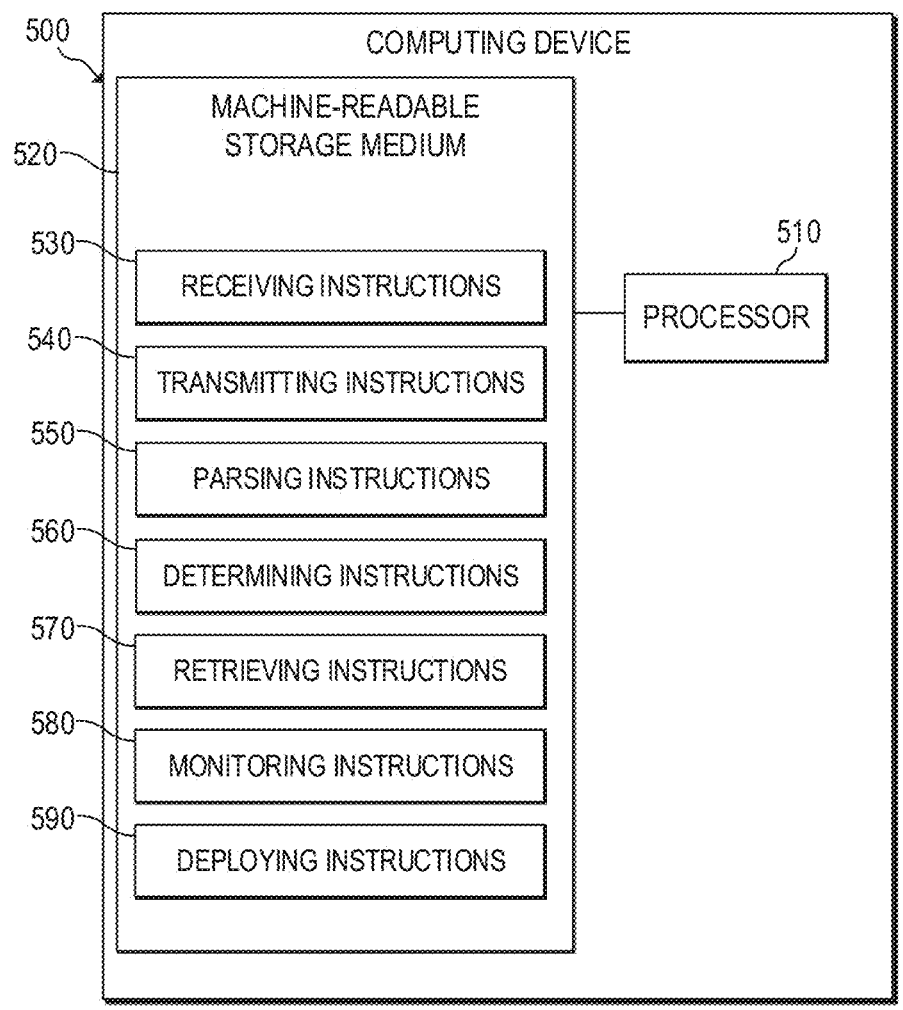
FIG. 5 is a block diagram of an example computing device to deploy documents to a server in a specific environment.

FIG. 5 is a block diagram of an example computing device with at least one processor 510 to execute instructions 530-590 within a machine-readable storage medium 520 to deploy documentations to a server in a specific environment.

Although the computing device 500 includes at least one processor 510 and machine-readable storage medium 520, it may also include other components that would be suitable to one skilled in the art. For example, computing device 500 may include an additional processing component and/or storage. In another implementation, the computing device executes instructions 530-590. Computing device 500 is an electronic device with the at least one processor 510 capable of executing instructions 530-590, and as such implementations of computing device 500 include a mobile device, server, data center, networking device, client device, computer, or other type of electronic device capable of executing instructions 530-590. The instructions 530-590 may be implemented as methods, functions, operations, and other processes implemented as machine-readable instructions stored on the storage medium 520, which may be non-transitory, such as hardware storage devices (e.g., random access memory (RAM), read only memory (ROM), erasable programmable ROM, electrically erasable ROM, hard drives, and flash memory).

The at least one processor 510 may fetch, decode, and execute instructions 530-590 to deploy API documentations to a server in a specific environment. Specifically, the at least one processor 510 executes instructions 530-590 to: parse configuration data associated with the particular application programming interface (API) associated with multiple remote applications executing on multiple servers in different environments respectively; determine a uniform resource location (URL) of a remote application executing on a particular server deployed in the specific environment; monitor the remote application at the URL for an update in the version of the multiple documents associated with the particular API; periodically query for a version of the remote application at the URL; receive a version of the remote application at the URL; store the version received in a query result in a version cache; retrieve multiple documents associated with the particular API corresponding to the updated version from the artifact repository in response to the update being detected at the remote application at the URL; etc.

Moreover, the at least one processor 510 further executes instructions 530-590 to: deploy the multiple documents to the particular server in the specific environment; retrieve an updated version of the multiple documents associated with the particular API from the artifact repository in response to the change being detected while monitoring the website at the URL; deploy the updated version of the multiple documents to the particular server in the specific environment; create a hierarchy of directories; store multiple API documentations in the hierarchy of directories; install multiple executable binary artifacts to the hierarchy of directories; etc.

The machine-readable storage medium 520 includes instructions 530-590 for the processor 510 to fetch, decode, and execute. In another example, the machine-readable storage medium 520 may be an electronic, magnetic, optical, memory, storage, flash-drive, or other physical device that contains or stores executable instructions. Thus, the machine-readable storage medium 520 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 520 may include an application and/or firmware which can be utilized independently and/or in conjunction with the at least one processor 510 to fetch, decode, and/or execute instructions of the machine-readable storage medium 520. The application and/or firmware may be stored on the machine-readable storage medium 520 and/or stored on another location of the computing device 500.

We claim:

1. A method for deploy environment-specific application programming interface (API) documentation, the method comprising:

parsing, by a computing device, configuration data associated with multiple application programming interfaces (APIs) that are served by multiple remote applications executing on multiple servers in different environments respectively, each of the different environments comprising a different particular production phase;

determining, by the computing device, a respective uniform resource locators (URLs) of the multiple remote applications executing on respective servers deployed in the different environments;

periodically querying, by the computing device, respective versions of the respective remote applications at the respective URLs;

storing, by the computing device, the respective versions received in results of the queries in a version cache;

monitoring, by the computing device, respective remote applications at the respective URLs for an update in the respective version of the multiple documents associated with respective APIs;

retrieving, by the computing device, multiple documents associated with the respective APIs corresponding to the respective versions from an artifact repository; and deploying, by the computing device, the multiple documents to the respective servers on which the respective remote applications execute in the different environments, including:

creating a hierarchy of directories;

storing multiple API documentations in the hierarchy of directories; and installing multiple executable binary artifacts to the hierarchy of directories;

wherein the multiple API documentations and the multiple executable binary artifacts comprise a different collection of documents than a collection of API documentations and executable binary artifacts deployed in another environment.

2. The method of claim 1, wherein each of the different environments comprises a collection of servers and applications that work together at a particular production phase, the collection of servers and the applications being accessible to a particular set of users.

3. The method of claim 2, wherein the particular production phase comprises a production environment accessible to end users, a testing environment accessible to testers, or a development environment accessible to developers.

4. The method of claim 1, wherein the configuration data comprises one of an extensible markup language (XML) file, a JavaScript Object Notation (JSON) file, a YAML file, a binary file, and a database file, and wherein the configuration data includes a plurality of API tags, each API tag being associated with a URL associated with the remote application.

5. The method of claim 1, further comprising:

retrieving, by the computing device, an updated version of the multiple documents associated with the respective API from the artifact repository in response to the change being detected while monitoring the website at the URL; and deploying, by the computing device, the updated version of the multiple documents to the respective particular server in the respective environment.

6. A system to deploy environment-specific application programming interface (API) documentation, the system comprising:

a processor;

an artifact repository coupled to a document web server to store multiple documents associated with a plurality of APIs in a hierarchy of directories;

a document management component coupled to the document web server to serve the multiple documents associated with the APIs to multiple; respective servers on which the respective APIs execute, each server being deployed in one of a plurality of different environments, the different environments each comprising a different particular production phase, the document management component to:

parse configuration data associated with each respective API to determine a respective uniform resource location (URL) of a respective remote application executing on a respective server deployed in the different environments;

periodically query for respective versions of the respective remote applications at the respective URLs;

store the versions received in results of the query in a version cache;

monitor each remote application at the respective URL for an update in the version of the multiple documents associated with the respective API associated with the respective remote application;

retrieve the multiple documents associated with each respective API corresponding to the updated version from the artifact repository, the multiple documents to be deployed by the document web server to the respective server in the respective environment;

deploy the multiple documents to the respective servers on which the respective remote applications execute in the respective environment;

create a hierarchy of directories;

store a collection of API documentations in the hierarchy of directories; and install a collection of executable binary artifacts to the hierarchy of directories;

wherein the multiple API documentations and the multiple executable binary artifacts comprise a different collection of documents than a collection of API documentations and executable binary artifacts deployed in another environment.

7. The system of claim 6, wherein the document management component is external to the document web server and communicates with both the document web server and the artifact repository.

8. The system of claim 6, wherein each of the different environments comprises a collection of servers and applications that work together at a particular production phase, the collection of servers and applications being accessible to a particular set of users.

9. The system of claim 8, wherein the particular production phase comprises a production environment accessible to end users, a testing environment accessible to testers, or a development environment accessible to developers.

10. The system of claim 6, wherein the configuration data comprises one of an extensible markup language (XML) file, a JavaScript Object Notation (JSON) file, a YAML file, a binary file, and a database file, and wherein the configuration data includes a plurality of API tags, each API tag being associated with a URL associated with the remote application.

11. The system of claim 6, wherein the artifact repository comprises a plurality of directories, each directory storing, in compressed form, a collection of API documentations and a collection of executable binary artifacts associated with a particular version of the respective API received from a build server.

12. A non-transitory machine-readable storage medium encoded with instructions executable by at least one processor of a network device, the machine-readable storage medium comprising instructions to:
   parse configuration data associated with a plurality of application programming interfaces (APIs) associated with multiple, respective remote applications executing on multiple, respective servers in different environments respectively, the different environments each comprising a different particular production phase;
   determine a respective uniform resource location (URL) of a plurality of remote applications executing on a plurality of respective servers deployed in the different environments;
   periodically query for respective versions of the respective remote applications at the respective URLs;
   store the versions received in results of the queries in a version cache;
   monitor the remote applications at the respective URLs for an update in the respective version of the multiple documents associated with the respective API;
   retrieve the multiple documents associated with the respective APIs corresponding to the updated version from an artifact repository in response to the update being detected at the respective remote application at the respective URL, the multiple documents to be deployed to the respective particular server in the respective environment;
   deploy the multiple documents to the respective particular server in the respective environment;
   create a hierarchy of directories;
   store multiple API documentations in the hierarchy of directories; and
   install multiple executable binary artifacts to the hierarchy of directories,
      wherein the multiple API documentations and the multiple executable binary artifacts comprise a different collection of documents than a collection of API documentations and executable binary artifacts deployed in another environment.

13. The non-transitory machine-readable storage medium of claim 12, wherein each of the different environments comprises a collection of servers and applications that work together at a particular production phase, the collection of servers and applications being accessible to a particular set of users.

14. The non-transitory machine-readable storage medium of claim 13, wherein the particular production phase comprises a production environment accessible to end users, a testing environment accessible to testers, and a development environment accessible to developers.

* * * * *